(12) United States Patent
Islam et al.

(10) Patent No.: US 12,022,482 B2
(45) Date of Patent: Jun. 25, 2024

(54) SEQUENCE-BASED UPLINK (UL) TRANSMISSION CANCELLATION FOR NEW RADIO (NR)

(71) Applicant: Apple Inc., Cupertino, CA (US)

(72) Inventors: Toufiqul Islam, Santa Clara, CA (US); Fatemeh Hamidi-Sepehr, Santa Clara, CA (US); Debdeep Chatterjee, San Jose, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 17/279,379

(22) PCT Filed: Sep. 27, 2019

(86) PCT No.: PCT/US2019/053636
§ 371 (c)(1),
(2) Date: Mar. 24, 2021

(87) PCT Pub. No.: WO2020/069428
PCT Pub. Date: Apr. 2, 2020

(65) Prior Publication Data
US 2021/0400644 A1 Dec. 23, 2021

Related U.S. Application Data

(60) Provisional application No. 62/739,033, filed on Sep. 28, 2018.

(51) Int. Cl.
*H04W 72/23* (2023.01)
*H04L 5/00* (2006.01)

(52) U.S. Cl.
CPC .......... *H04W 72/23* (2023.01); *H04L 5/0051* (2013.01)

(58) Field of Classification Search
None
See application file for complete search history.

(56) References Cited

U.S. PATENT DOCUMENTS

| | | | |
|---|---|---|---|
| 10,972,974 B2 | 4/2021 | Xiong et al. | |
| 2009/0164559 A1 | 1/2009 | Johnson et al. | |
| 2015/0139001 A1 | 5/2015 | Xue et al. | |
| 2018/0035459 A1 | 2/2018 | Islam et al. | |
| 2019/0246395 A1* | 8/2019 | Huang | H04W 72/12 |
| 2020/0344747 A1* | 10/2020 | Park | H04W 72/21 |

(Continued)

FOREIGN PATENT DOCUMENTS

| | | | | |
|---|---|---|---|---|
| CN | 107409413 A1 | 11/2017 | | |
| EP | 3836700 A1 * | 6/2021 | .......... | H04W 52/146 |

(Continued)

OTHER PUBLICATIONS

International Search Report and Written Opinion directed to related International Application No. PCT/US2019/053636, dated Jan. 21, 2020, 7 pages.

(Continued)

*Primary Examiner* — Anh Vu H Ly
(74) *Attorney, Agent, or Firm* — Sterne, Kessler, Goldstein & Fox P.L.L.C.

(57) ABSTRACT

Methods, systems, and storage media are described for the cancellation of uplink (UL) transmissions for new radio (NR). Other embodiments may be described and/or claimed.

17 Claims, 9 Drawing Sheets

(56) References Cited

U.S. PATENT DOCUMENTS

| | | | |
|---|---|---|---|
| 2021/0168783 A1* | 6/2021 | Islam | H04W 72/23 |
| 2021/0329634 A1* | 10/2021 | Kim | H04L 27/26 |
| 2022/0039100 A1* | 2/2022 | Yoshioka | H04W 72/56 |
| 2022/0150874 A1* | 5/2022 | Park | H04W 72/23 |

FOREIGN PATENT DOCUMENTS

| | | | | |
|---|---|---|---|---|
| KR | 20090063592 A | | 6/2009 | |
| WO | WO 2007009339 A1 | | 1/2007 | |
| WO | WO 2018085044 A1 | | 5/2018 | |
| WO | WO 2018089911 A1 | | 5/2018 | |
| WO | WO-2021159065 A1 | * | 8/2021 | H04B 7/0695 |
| WO | WO-2022013783 A1 | * | 1/2022 | |

OTHER PUBLICATIONS

Zte, "On Inter-UE multiplexing between eMBB and URLLC", R1-1808212, 3GPP TSG RAN WG1 Meeting #94, Gothenburg, Sweden, Aug. 11, 2018, 6 pages.

Nec, "UL inter UE Tx prioritization/multiplexing of eMBB and URLLC", R1-1808565, 3GPP TSG RAN WG1 Meeting #94, Gothenburg, Sweden, Aug. 10, 2018, 3 pages.

LG Electronics, "Discussion on UL inter UE Tx prioritization" R1-1808532, 3GPP TSG RAN WG1 Meeting #94, Gothenburg, Sweden, Aug. 11, 2018, 6 pages.

Vivo, "UL inter-UE Tx prioritization for URLLC", R1-1808249, 3GPP TSG RAN WG1 Meeting #94, Gothenburg, Sweden, Aug. 10, 2018, 8 pages.

MediaTek Inc., "Evaluation and analysis for UL multiplexing between eMBB and URLLC", R1-1808286, 3GPP TSG RAN1 WG1 Meeting #94, Aug. 11, 2018; 7 pages.

Qualcomm Incorporated, "UL inter UE Tx prioritization/multiplexing," R1-1809458, 3GPP TSG-RAN WG1 #94, Aug. 17, 2018; 12 pages.

Vivo, "Offline discussion for UL inter UE Tx prioritization/multiplexing," R1-1809866, 3GPP TSG RAN WG1 Meeting #94, Aug. 24, 2018; 5 pages.

Notice of Grant directed to related Chinese Application No. 201980062707.6, dated Nov. 24, 2023, with machine-translation attached; 8 pages.

* cited by examiner

100

Retrieving from memory: configuration information to configure a resource set that a user equipment (UE) is to use to monitor for an uplink (UL) cancellation indication; and a control information sequence to provide the UL cancellation indication
105

Encoding a first message that includes the configuration information for transmission to the UE
110

Encoding a second message that includes the control information sequence for transmission to the UE
115

FIG. 1

| Seq index | Normal CP | | | |
|---|---|---|---|---|
| 0 | +1 | +1 | +1 | +1 |
| 1 | +1 | -1 | +1 | -1 |
| 2 | +1 | +1 | -1 | -1 |
| 3 | +1 | -1 | -1 | +1 |
| 4 | +j | +j | +j | +j |
| 5 | +j | -j | +j | -j |
| 6 | +j | +j | -j | -j |
| 7 | +j | -j | -j | +j |

SEQUENCE-BASED UPLINK (UL) TRANSMISSION CANCELLATION FOR NEW RADIO (NR)

RELATED APPLICATIONS

This application is a U.S. National Phase of International Application No. PCT/US2019/053636, filed Sep. 27, 2019, which claims priority to U.S. Provisional Patent Application No. 62/739,033 filed Sep. 28, 2018 and entitled "SYSTEM AND METHOD OF SEQUENCE BASED UPLINK TRANSMISSION CANCELLATION INDICATION," the entire disclosures of which are incorporated by reference in their entirety.

BACKGROUND

Among other things, embodiments described herein are directed to the cancellation of uplink (UL) transmissions for new radio (NR). Embodiments of the present disclosure may be utilized in conjunction with UL transmissions such as physical uplink shared channel (PUSCH), either grant-based or grant-free such as Type 1 or 2 UL configured grant, physical uplink control channel (PUCCH), sounding reference signal (SRS), or physical random access channel (PRACH).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 2:
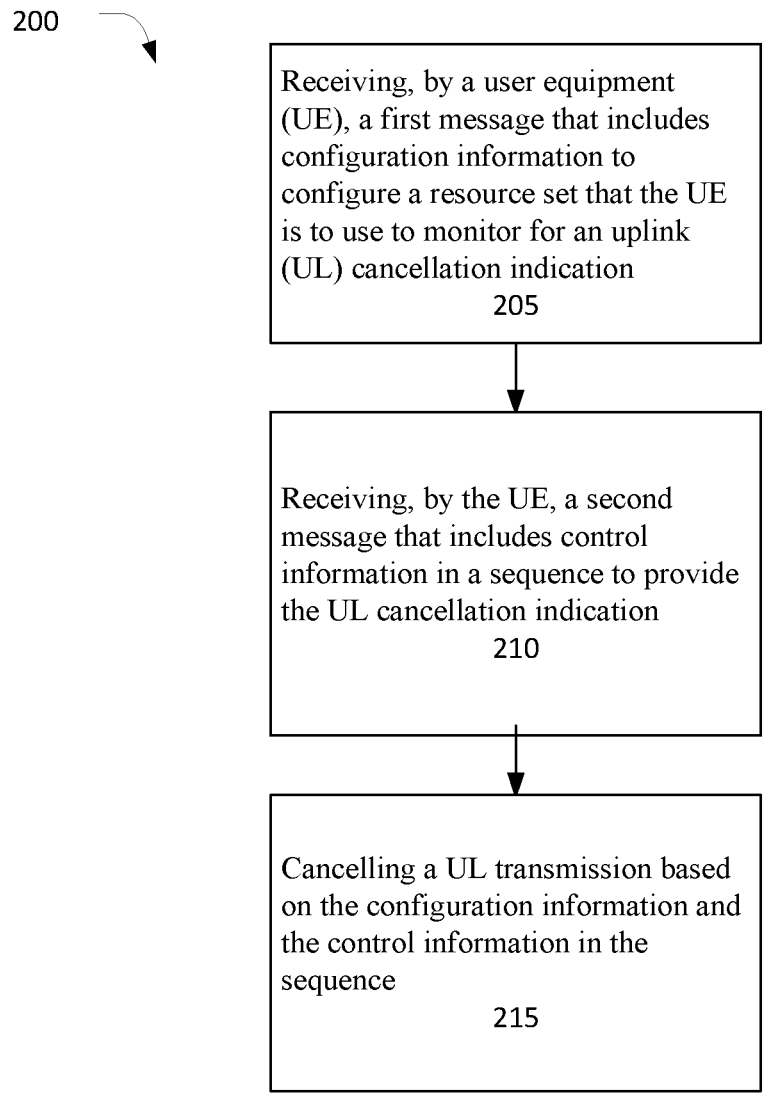

Embodiments discussed herein may relate to the cancellation of UL transmissions for new radio NR. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

New radio (NR) systems will support coexistence of diverse services and traffic communication in a common carrier. As different services have different requirements and characteristics, multiplexing techniques need to be studied so that transmission of packets of each service type is minimally impacted.

Embodiments described herein may be directed to uplink (UL) multiplexing of transmissions with different reliability and/or latency requirements. In particular, some embodiments may be directed to one or more indications of impacted resources that can be conveyed to one or more UEs so that ongoing or imminent UL transmission can be adjusted in order to avoid adversely impacting other UL transmission that may occur in shared resources. Transmission of one service type may be more urgent than the other, and may be prioritized over other ongoing transmissions.

Transmission of the indication in a physical downlink control channel (PDCCH) has been considered. PDCCH based techniques append cyclical redundancy check (CRC) to the payload, where the CRC can be based on a radio network temporary identifier (RNTI).

Detection of sequence based indication may be simpler than PDCCH based indication. Low complexity correlation receiver can be used. Also, if only small payload of control is transmitted, gain of coherent reception is not large, i.e., when control signaling is transmitted along with reference signals for channel estimation, such as in PDCCH.

Embodiments within this disclosure may be directed to sequence based control signaling to cancel/pause/postpone an UL transmission. UL transmissions can be physical uplink shared channel (PUSCH), either grant-based or grant-free such as Type 1 or 2 UL configured grant, physical uplink control channel (PUCCH), sounding reference signal (SRS), or physical random access channel (PRACH). Alternative embodiments include transmission of cancellation indication in a PDCCH. For sequence based transmission, the downlink control information (DCI) can be transmitted in a sequence without CRC, especially if the payload is small. Few bits of control information can be sent to a user equipment (UE) in a sequence over a configured time-frequency resource. However, in order to realize efficient resource management from network perspective, sequences with UE specific control information can be code-multiplexed over a common time-frequency resource. In other words, a group of UEs monitor/receive for respective sequences in the common time-frequency resource. The UE specific sequences are multiplexed and transmitted in a common time-frequency resource. Note that although described in this disclosure as "UE-specific" sequences and their configurations, UE-group-specific assignment of sequences may also be realized using the disclosed framework.

Structure of Signal Transmission and Resource Set Configuration

Figures 4A, 4B:
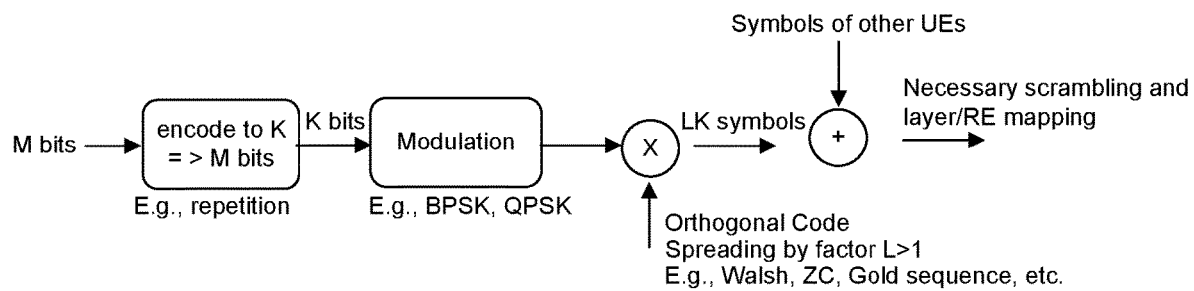
FIG. 4A is a flow diagram illustrating an example of mapping UE-specific control information to an encoded, modulated spread sequence in accordance with some embodiments
FIG. 4B illustrates an example of a spreading sequence in accordance with some embodiments.

FIG. 4A illustrates a general structure of mapping UE-specific information to an encoded, modulated and spread sequence which is multiplexed with symbols of other UEs. A composite multiplexed signal of a group of UEs is mapped to a common set of REs after scrambling, layer processing, and other steps before over-the-air transmission. In the example in FIG. 4A, a structure is shown where M≥1 bits of control information payload of a UE is encoded into K bits, e.g., simple repetition coding can be applied where K can be multiple of M, or Reed Muller (RM) coding may be used as an alternative. The encoded bits are then modulated and subsequently spread by an L-point sequence. The sequence can be UE specific configured by higher layer. In one example, sequence can be obtained based on C-RNTI or based on a higher-layer-configured parameter. In another example, same sequence or information of M bits may be common to a group of UEs. Choice of sequences may include Walsh sequence, Zadoff-Chu sequence, Gold sequence, etc. Finally LK spread symbols of different UEs are multiplexed and then mapped to a common set of REs after further processing, such as layer mapping, scrambling, etc.

FIG. 4B illustrates an example of a spreading sequence. In this example, the length of four spreading sequence examples are shown for a normal CP. In one example, each UE is indicated an index from the set, and different UEs monitoring for the sequence in a common resource set are indicated different indices by the network.

Figure 4C:
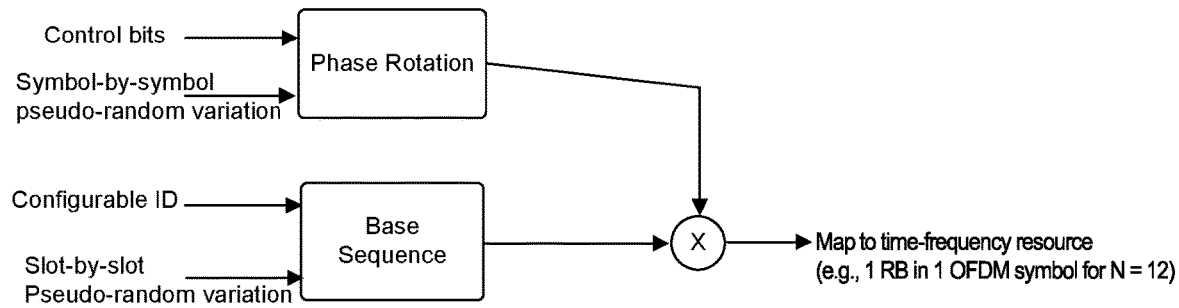
FIG. 4C illustrates an example of sequence generation by phase rotation from a base sequence in accordance with some embodiments.
Figure 4D:
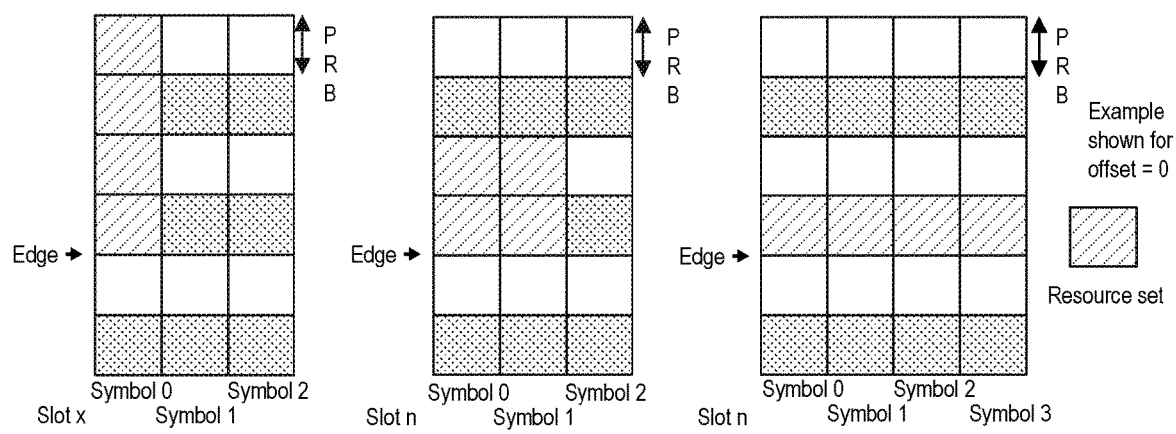
FIG. 4D illustrates an example of a resource set in accordance with some embodiments.

In some embodiments, as illustrated in FIG. 4C, a transmitted sequence where control information bits are mapped is generated by different phase rotation or cyclic shift of an underlying length-N base sequence. In one example, N can be $2^M*12$, where M=>0 integer. M can be numerology specific. In other words, phase rotation or cyclic shift of the base sequence carries the information. Linear phase rotation in frequency domain can also be referred to as cyclic shift in time domain. The base sequence can be configured per cell using an identity provided as part of system information or based on a UE-specifically configured identity/parameter. In one example, the sequence can be mapped to $2^M$ RBs in an OFDM symbol if $N=2^M*12$. In another example, if control signaling occupies two OFDM symbol, then same information/sequence can be repeated in both OFDM symbols either in same or over different set of RBs.

In one example, for N=12 length sequence, 12 phase rotations can be defined/identified, providing up to 12 orthogonal sequences from each base sequence. Furthermore, phase rotation of sequence may further depend on a reference rotation. For example, if sequence of four UEs are multiplexed on same time-frequency resource, four UEs may use 0, $2\pi3/12$, $2\pi6/12$, $2$ $2\pi9/12$ respectively. Optionally, a cyclic shift hopping can be adopted where a phase offset varying between different slots is added, which may help to randomize interference. In another example, the base sequence may vary on slot-by-slot basis, such as by sequence hopping. This may be useful to randomize interference between cells.

In one example, if multiple OFDM symbols are used for sequence transmission, same information may be transmitted in the symbols, however, reference phase rotation and/or frequency domain resources may vary.

In some embodiments, the UE needs to be aware of at least one resource set where it monitors for the sequence-based control information. In one example, one or more resource sets are configured to a UE for each configured DL BWP. The configuration of the resource set(s) can be provided together with bandwidth part configuration or separately. In embodiments, the configuration of each resource set includes one or more of the following:
   Resource set index
   Number of consecutive symbols
   Starting symbol within a slot
   Set of PRBs
   Mapping to antenna ports and whether to apply any pre-coding cycling, and the granularity of such precoding cycling, if any
      Alternatively, mapping to antenna ports may be fixed in the specifications
   More generally, the resource set may map to K≥1 PRBs and L≥1 consecutive symbols. Few examples of resource set RE mapping are shown in Figure D. In one alternative, the K PRBs may or may not be continuous in frequency domain. The mapping of a sequence to time-frequency resources may be specified (either frequency-first or time-first), or conveyed as part of the configuration
   In each resource set, there can be one or more search spaces configured to detect the sequence. In embodiments, as part of the search space configuration, a UE may obtain one or more of the following, related to the sequence based DCI format:
   Association between search space with a resource set
   Aggregation level (or repetition level), where "aggregation level" corresponds to a number of repetitions of a sequence in either frequency- and/or time-domain
      The repetitions of a sequence could be mapped frequency-first or time-first and the particular choice could be either configured via higher layers or specified.
   Monitoring periodicity, e.g., P=>1 symbols/slots
   Monitoring offset/starting location, e.g., L symbols/slots, where e.g., L can be 0≤L<P
   Monitoring pattern, e.g., first symbol(s) of one or more resource sets within a slot
   A duration, e.g., L symbols/slots, and usually L<P. It implies for the duration specified, UE monitors the search space according to the monitoring pattern.
   Candidate starting PRBs for the case wherein multiple sequences (including their repetitions) may be transmitted within a single resource set.
      Note that this information may be derived based on other configured information, e.g., number of candidate sequences the UE (that differ in terms of one or more: time, frequency, or code-domain mapping) is expected to monitor for.

In one example, in order to reduce complexity, a search space for monitoring the DCI format based on a sequence can be monitored with just one aggregation level such as 2 or 4 or 8 or 16. As another alternative, instead of repeating a single sequence, sequences of different lengths may be generated based on a configured sequence-length using a particular choice of initialization.

In some embodiments, the search space configuration may also include phase rotation/cyclic shift or orthogonal spreading sequence information for the UE. More generally, a UE may obtain UE-specific phase rotation or cyclic shift or orthogonal spreading sequence by a UE specific higher layer signaling, such as radio resource control (RRC) signaling. Alternatively, the UE may obtain the phase rotation or cyclic shift or orthogonal spreading sequence as function of C-RNTI or a configured RNTI.

In one example, the resource set can be one of the control resource sets (CORESETs) configured in the active downlink (DL) bandwidth part (BWP) and the search space can be one of the common search space associated with a CORE-SET. Hence, as part of the common search space configuration, network may notify UE to monitor for DCI format based on sequence that is not appended with any CRC/RNTI in the search space. In other words, as part of search space configuration, the UE may be notified to monitor a sequence-based DCI format in the search space with given aggregation level(s).

Figure 3:
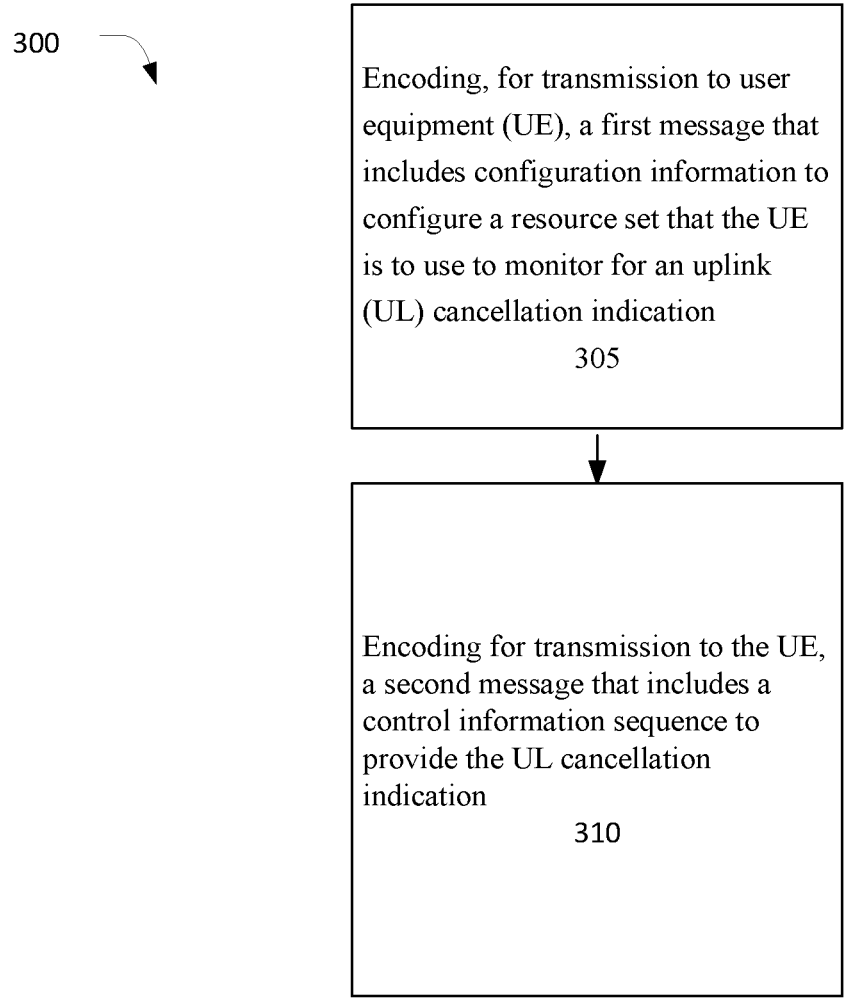

In another example, where if resource set is different from CORESET, location of the resource can be implicitly obtained from configuration of other resources, such as resource used for synchronization signal block (SSB), a given CORESET, etc. In one example, there can be at least one CORESET configured within a DL BWP and frequency domain location of the resource set for monitoring DCI format in a sequence can be obtained as an offset to the location of a given CORESET. For example, the start physical resource block (PRB) of the resource set can be obtained as an offset from the edge PRB of the CORESET. In FIG. 3, offset=0 is considered. Other parameters of the configuration of resource set are higher layer configured.

In another example, the sequence can be mapped to one or more resource sets with or without repetitions. The repetition factor can be higher layer configured, such as UE specific or group-based RRC signaling.

In one example, the resource set used for transmitting sequence based DCI for cancellation indication can be avoided for PDSCH scheduling, i.e., PDSCH can be rate-matched around the resource set. Alternatively, priority and/or multiplexing rules can be defined, to handle any potential overlaps between transmitting sequences based DCI for cancellation indication and other transmissions/channels.

In some embodiments, sequence based cancellation indication can be used to cancel/drop/postpone/pause UL grant-based or grant-free transmission. Moreover, it can also be used to cancel/drop/postpone/pause UL control information transmission in a PUCCH. Hence, UE may monitor for the sequence based indication following an UL grant or a DL grant, in order to cancel UL data or PUCCH transmission respectively.

The monitoring offset may be counted from the slot where UL or DL grant is received. Alternatively, it can be counted from system frame number. If duration is configured as part of the search space in a resource set, UE may monitor sequence over the indicated duration only. The monitoring occasions within the duration may be given by the monitoring pattern.

In one example, UE processing time for sequence based DCI may be less than N2 symbols, which is minimum DCI decoding time if it is transmitted in a PDCCH.

In one example, an activation signaling can be provided to UE via higher layer signaling (such as UE specific RRC signaling) to turn ON or OFF monitoring for the cancellation indication in a sequence.

In one example, a cell specific sequence may also be transmitted and a group of UEs that are configured to monitor cancellation indication may monitor the sequence based control information, according to the resource set and search space configuration. In one example, sequence may be mapped to common search space.

In some embodiments, detail monitoring configurations are provided when UL cancellation indication DCI is transmitted in a PDCCH. Similar embodiments, such as for resource set and search space configuration and DCI monitoring, can be also be applicable for sequence based UL cancellation DCI transmission.

Content

In some embodiments, sequence-based DCI is more attractive when control information payload is small. Hence, for each UE, few bits of control information may be mapped to a sequence.

In one embodiment, one bit of control information for each UE can be used and mapped to a sequence. One bit may indicate whether to drop/cancel (e.g., bit=1) or continue (e.g., bit=0, or vice versa) all or part of the corresponding UL transmission.

In some embodiments, one or more of: the time, frequency, and code domain information for a detected sequence may be used to indicate the time-frequency region within which the UE may not perform any UL transmissions, i.e., the UE is expected to cancel any UL transmission that may overlap with even one RE with the identified time-frequency region.

In related embodiments, the time-frequency region in which any UL transmissions is to be canceled can be defined using a specified (e.g., as function of SCS) or configured duration (in number of symbols) and with starting symbol defined w.r.t. the time domain location (slot and symbols) for the detected sequence or the starting symbol for the resource set in which the UE detects a sequence.

Similarly, in some embodiments, the frequency domain location can be determined based on the starting PRB in which a sequence is detected, and a number of consecutive PRBs that may be configured via higher layers or specified on a per SCS basis.

Accordingly, upon detection of a particular sequence, the UE is expected to refrain from any UL transmissions within the identified resource region. Further, any UL transmission that may overlap in part with the identified region may be dropped entirely or, alternatively, only the transmissions in the overlapped symbols may be dropped.

If a UE-group based indication is mapped to a sequence, e.g., a sequence comprises information bits addressed by a group of UEs, the information bits may comprise a bitmap to indicate an impacted time-frequency region within a semi-statically configured time-frequency resource. The UEs getting the indication may refrain from UL transmission that overlap with the impacted region. Bitmap may comprise X*Y bits, where X refers to number of time partition and Y refers to number of frequency partition within the semi-statically configured resource. Hence, M should be at least X*Y bits in this example.

In some embodiments, various examples for content of the UL cancellation indications are provided when UL cancellation indication DCI is transmitted in a PDCCH. Similar embodiments can be also be applicable for sequence based UL cancellation DCI transmission, i.e., similar content comprising a given number of bits can be mapped to a sequence.

Figure 5:
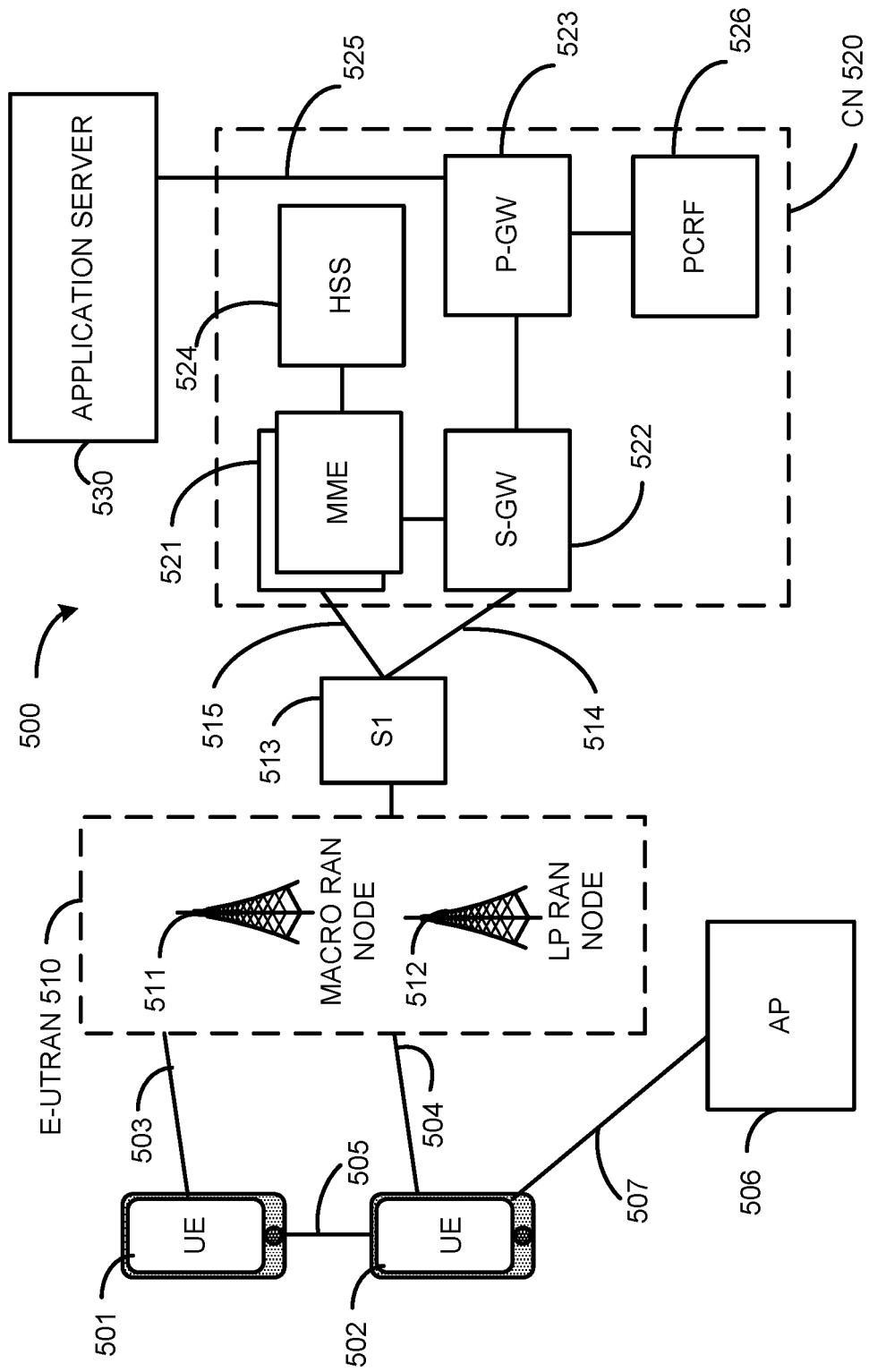
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be anode for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
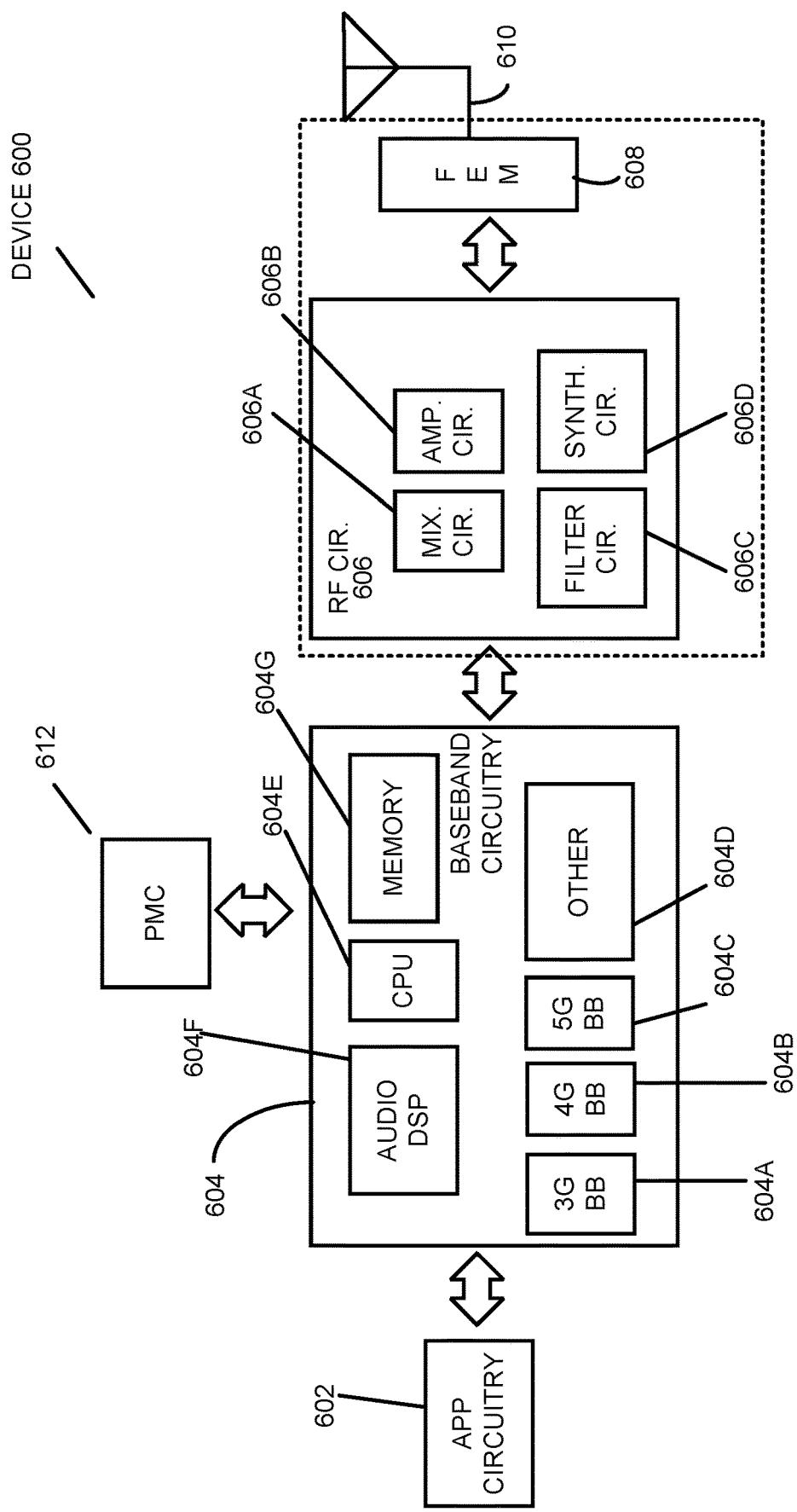
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
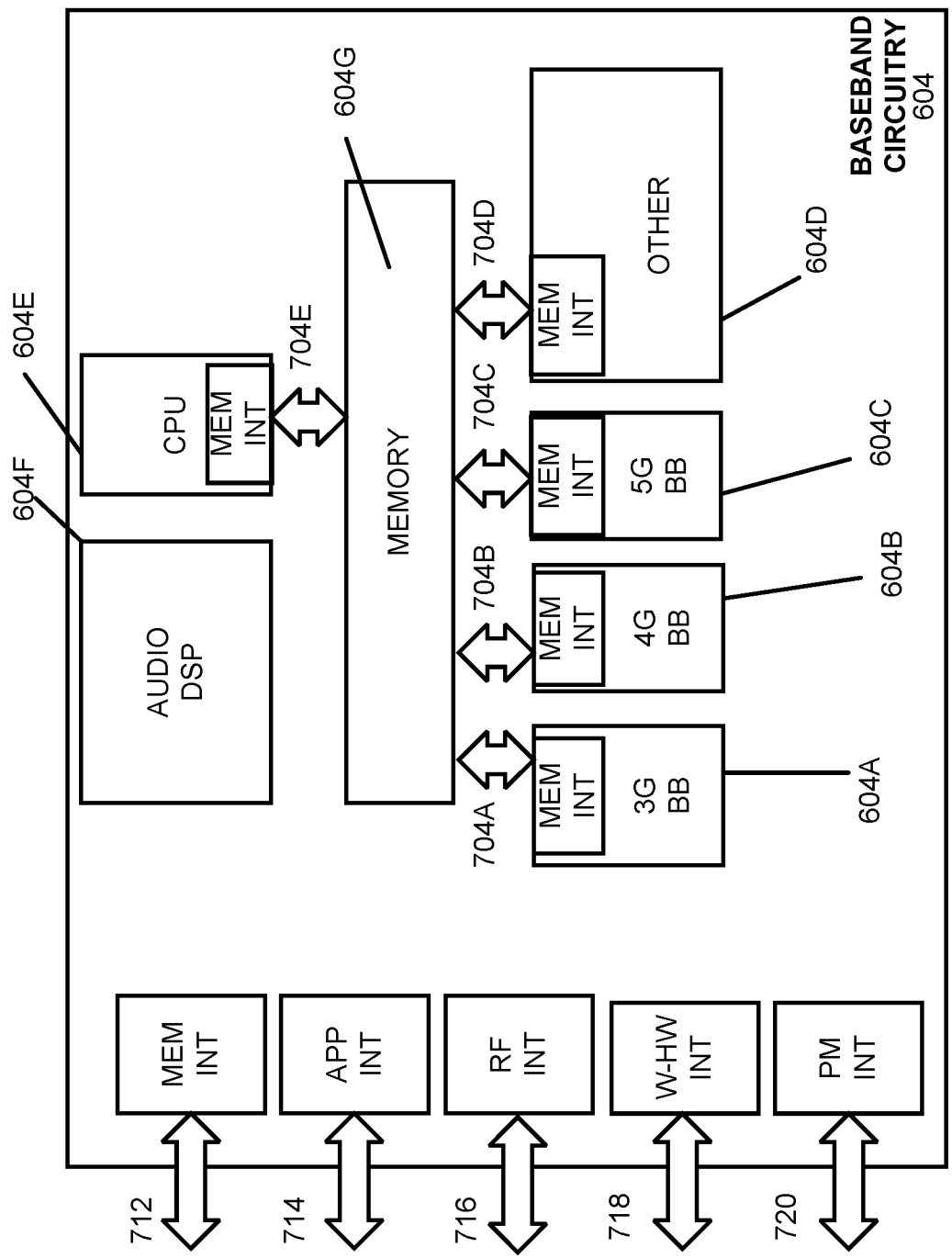
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
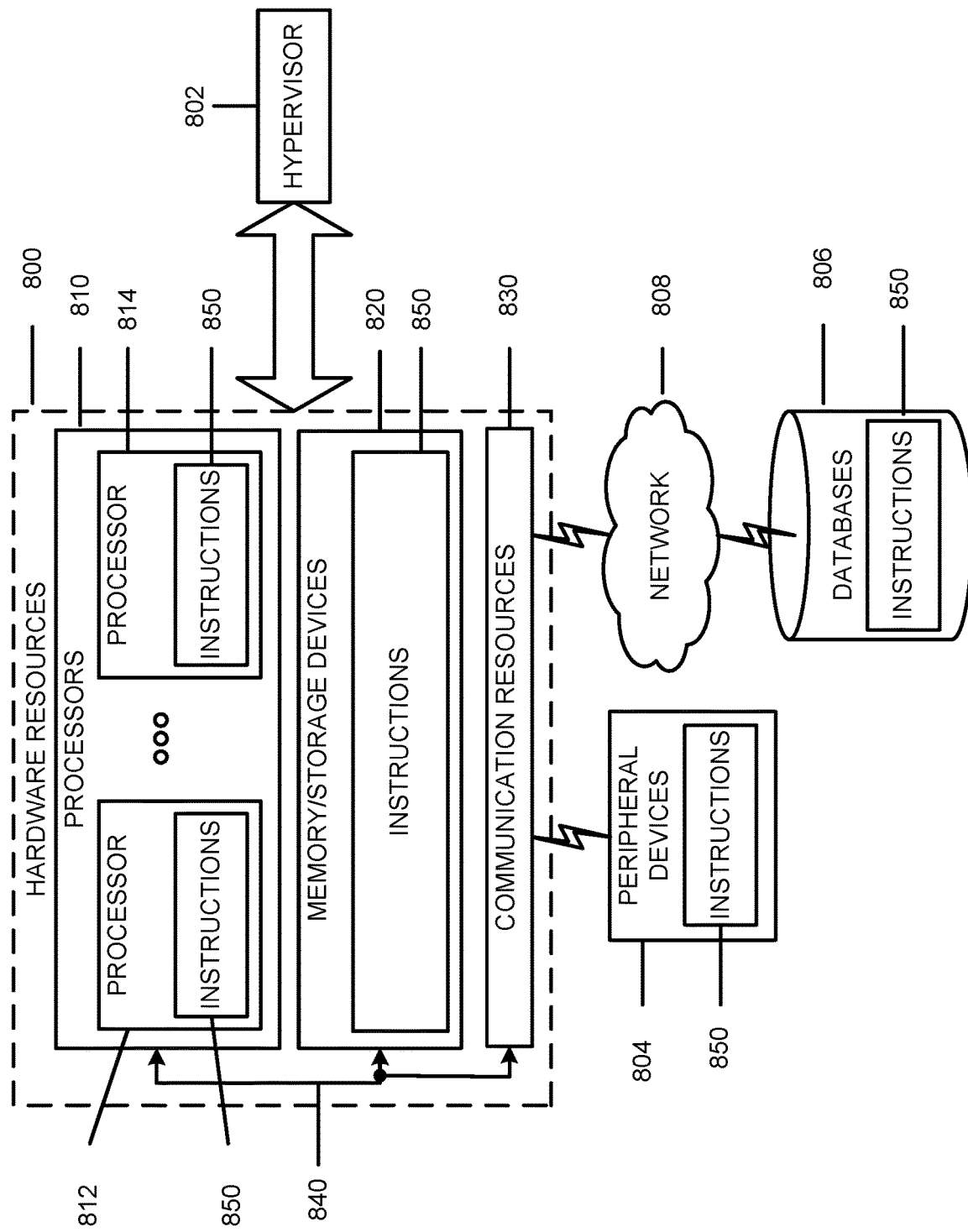
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving from memory: configuration information to configure a resource set that a user equipment (UE) is to use to monitor for an uplink (UL) cancellation indication; and a control information sequence to provide the UL cancellation indication. Operation flow/algorithmic structure 100 may further include, at 110, encoding a first message that includes the configuration information for transmission to the UE. Operation flow/algorithmic structure 100 may further include, at 115, encoding a second message that includes the control information sequence for transmission to the UE.

Another example of an operation flow/algorithmic structure is depicted in FIG. 2, which may be performed by UE in accordance with some embodiments. In this example, operation flow/algorithmic structure 200 may include, at 205, receiving, by a user equipment (UE), a first message that includes configuration information to configure a resource set that the UE is to use to monitor for an uplink (UL) cancellation indication. Operation flow/algorithmic structure 200 may further include, at 210, receiving, by the UE, a second message that includes control information in a sequence to provide the UL cancellation indication. Operation flow/algorithmic structure 200 may further include, at 215, canceling a UL transmission based on the configuration information and the control information in the sequence.

Another example of an operation flow/algorithmic structure is depicted in FIG. 3, which may be performed by gNB in accordance with some embodiments. In this example, operation flow/algorithmic structure 300 may include, at 305, encoding, for transmission to user equipment (UE), a first message that includes configuration information to configure a resource set that the UE is to use to monitor for an uplink (UL) cancellation indication. Operation flow/algorithmic structure 300 may further include, at 310, encoding for transmission to the UE, a second message that includes a control information sequence to provide the UL cancellation indication.

EXAMPLES

Some non-limiting examples are provided below.

Example 1 includes an apparatus comprising: memory to store: configuration information to configure a resource set that a user equipment (UE) is to use to monitor for an uplink (UL) cancellation indication; and a control information sequence to provide the UL cancellation indication; and processing circuitry, coupled with the memory, to: encode a first message that includes the configuration information for transmission to the UE; and encode a second message that includes the control information sequence for transmission to the UE.

Example 2 includes the apparatus of example 1 or some other example herein, wherein the first message is encoded for transmission to the UE via a UE-specific radio resource control (RRC) signaling.

Example 3 includes the apparatus of example 1 or some other example herein, wherein the configuration information includes: a monitoring offset for a resource or search space, a monitoring periodicity of a search space in a resource, a phase rotation, a cyclic shift, an orthogonal spreading sequence, or a base sequence.

Example 4 includes the apparatus of example 1 or some other example herein, wherein the resource set includes: a resource set index, a number of consecutive symbols, a starting symbol within a slot, a set of physical resource blocks (PRBs), or an antenna port mapping.

Example 5 includes the apparatus of example 1 or some other example herein, wherein the UL cancellation indication comprises a one-bit field to indicate whether to cancel or continue a transmission.

Example 6 includes the apparatus of example 1 or some other example herein, wherein the configuration information includes an indication of a time-frequency region within which the UE is not to perform any UL transmissions.

Example 7 includes the apparatus of example 6 or some other example herein, wherein the indication of the time-frequency region includes: a duration defined by a number of symbols, and a starting symbol that is defined with respect to a time domain location for a detected sequence.

Example 8 includes the apparatus of example 1 or some other example herein, wherein the control information sequence is a Walsh sequence, a Zadoff-Chu sequence, or a Gold sequence.

Example 9 includes one or more computer-readable media storing instructions that, when executed by one or more processors, cause a user equipment (UE) to: receive a first message that includes configuration information to configure a resource set that the UE is to use to monitor for an uplink (UL) cancellation indication; receive a second message that includes control information in a sequence to provide the UL cancellation indication; and cancel a UL transmission based on the configuration information and the control information in the sequence.

Example 10 includes the one or more computer-readable media of example 9 or some other example herein, wherein the media further stores instructions for causing the UE to receive a UE-specific physical downlink control channel (PDCCH) message that is to schedule the UL transmission.

Example 11 includes the one or more computer-readable media of example 10 or some other example herein, wherein the media further stores instructions for causing the UE to monitor the UL cancellation indication subsequent to the reception of the PDCCH message.

Example 12 includes the one or more computer-readable media of example 9 or some other example herein, wherein the entire UL transmission is canceled.

Example 13 includes the one or more computer-readable media of example 9 or some other example herein, wherein a portion of the UL transmission is canceled.

Example 14 includes the one or more computer-readable media of example 9 or some other example herein, wherein the first message is received via UE-specific radio resource control (RRC) signaling.

Example 15 includes one or more computer-readable media storing instructions that, when executed by one or more processors, cause a next-generation NodeB (gNB) to: encode a first message for transmission to a user equipment (UE), the first message comprising configuration information to configure a resource set that the UE is to use to monitor an uplink (UL) cancellation indication; and encode a second message for transmission to the UE, the second message comprising a control information sequence to provide the UL cancellation indication.

Example 16 includes the one or more computer-readable media of example 15 or some other example herein, wherein the first message is encoded for transmission to the UE via a UE-specific radio resource control (RRC) signaling.

Example 17 includes the one or more computer-readable media of example 15 or some other example herein, wherein the configuration information includes: a monitoring offset for a resource or search space, a monitoring periodicity of a search space in a resource, a phase rotation, a cyclic shift, an orthogonal spreading sequence, or a base sequence.

Example 18 includes the one or more computer-readable media of example 15 or some other example herein, wherein the resource set includes: a resource set index, a number of consecutive symbols, a starting symbol within a slot, a set of physical resource blocks (PRBs), or an antenna port mapping.

Example 19 includes the one or more computer-readable media of example 15 or some other example herein, wherein the UL cancellation indication comprises a one-bit field to indicate whether to cancel or continue a transmission.

Example 20 includes the one or more computer-readable media of example 15 or some other example herein, wherein the configuration information includes an indication of a time-frequency region within which the UE is not to perform any UL transmissions, and wherein the indication of the time-frequency region includes: a duration defined by a number of symbols, and a starting symbol that is defined with respect to a time domain location for a detected sequence.

Example 21 may include an apparatus comprising means to perform one or more elements of a method described in or related to any of example 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of example 1-20, or any other method or process described herein.

Example 23 may include an apparatus comprising logic, modules, and/or circuitry to perform one or more elements of a method described in or related to any of example 1-20, or any other method or process described herein.

Example 24 may include a method, technique, or process as described in or related to any of example 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of example 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
a memory configured to store:
configuration information to configure a resource set that a user equipment (UE) is to use to monitor for an uplink (UL) cancellation indication; and
a control information sequence to provide the UL cancellation indication; and processing circuitry, coupled with the memory, configured to:
encode a first message that includes the configuration information for transmission to the UE; and
encode a second message that includes the control information sequence for transmission to the UE, wherein the UL cancellation indication comprises an indication of a time-frequency region within which the UE is not to perform any UL transmissions,
wherein the UL cancellation indication is configured to cause the UE to cancel a UL transmission associated with another time-frequency region that overlaps in part with the time-frequency region,
wherein the indication of the time-frequency region comprises a duration defined by a number of symbols and a starting symbol that is defined with respect to a time domain location for the control information sequence.

2. The apparatus of claim 1, wherein the first message is encoded for transmission to the UE via a UE-specific radio resource control (RRC) signaling.

3. The apparatus of claim 1, wherein the configuration information comprises: a monitoring offset for a resource or a search space, a monitoring periodicity of the search space in the resource set, a phase rotation, a cyclic shift, an orthogonal spreading sequence, or a base sequence.

4. The apparatus of claim 1, wherein the resource set comprises: a resource set index, a number of consecutive symbols, a starting symbol within a slot, a set of physical resource blocks (PRBs), or an antenna port mapping.

5. The apparatus of claim 1, wherein the control information sequence is a Walsh sequence, a Zadoff-Chu sequence, or a Gold sequence.

6. One or more non-transitory computer-readable media storing instructions that, when executed by one or more processors, cause a user equipment (UE) to:
receive a first message that comprises configuration information to configure a resource set that the UE is to use to monitor for an uplink (UL) cancellation indication;
receive a second message that comprises control information in a sequence to provide the UL cancellation indication;
cancel a UL transmission based on the configuration information and the control information in the sequence, wherein the UL cancellation indication comprises an indication of a time-frequency region within which the UE is not to perform any UL transmissions; and
cancel a second UL transmission associated with another time-frequency region that overlaps in part with the time-frequency region,
wherein the indication of the time-frequency region comprises a duration defined by a number of symbols and a starting symbol that is defined with respect to a time domain location for the sequence.

7. The one or more non-transitory computer-readable media of claim 6, wherein the instructions, when executed by the one or more processors, further cause the UE to receive a UE-specific physical downlink control channel (PDCCH) message that is to schedule the UL transmission.

8. The one or more non-transitory computer-readable media of claim 7, wherein the instructions, when executed by the one or more processors, further cause the UE to monitor the UL cancellation indication subsequent to the reception of the PDCCH message.

9. The one or more non-transitory computer-readable media of claim 6, wherein an entirety of the UL transmission is cancelled.

10. The one or more non-transitory computer-readable media of claim 6, wherein a portion of the UL transmission is cancelled.

11. The one or more non-transitory computer-readable media of claim 6, wherein the first message is received via UE-specific radio resource control (RRC) signaling.

12. One or more non-transitory computer-readable media storing instructions that, when executed by one or more processors, cause a base station to:
encode a first message for transmission to a user equipment (UE), the first message comprising configuration information to configure a resource set that the UE is to use to monitor an uplink (UL) cancellation indication; and
encode a second message for transmission to the UE, the second message comprising a control information sequence to provide the UL cancellation indication, wherein the UL cancellation indication comprises an indication of a time-frequency region within which the UE is not to perform any UL transmissions,
wherein the UL cancellation indication is configured to cause the UE to cancel a UL transmission associated with another time-frequency region that overlaps in part with the time-frequency region, and
wherein the indication of the time-frequency region comprises a duration defined by a number of symbols and a starting symbol that is defined with respect to a time domain location for the control information sequence.

13. The one or more non-transitory computer-readable media of claim 12, wherein the first message is encoded for transmission to the UE via a UE-specific radio resource control (RRC) signaling.

14. The one or more non-transitory computer-readable media of claim 12, wherein the configuration information comprises: a monitoring offset for a resource or a search space, a monitoring periodicity of the search space in the resource set, a phase rotation, a cyclic shift, an orthogonal spreading sequence, or a base sequence.

15. The one or more non-transitory computer-readable media of claim 12, wherein the resource set comprises: a resource set index, a number of consecutive symbols, a starting symbol within a slot, a set of physical resource blocks (PRBs), or an antenna port mapping.

16. The one or more non-transitory computer-readable media of claim 12, wherein the control information sequence is a Walsh sequence, a Zadoff-Chu sequence, or a Gold sequence.

17. The one or more non-transitory computer-readable media of claim 6, wherein the sequence is a Walsh sequence, a Zadoff-Chu sequence, or a Gold sequence.

* * * * *